Nov. 18, 1958 K. M. WELCH 2,860,471
DISK HARROW TORSION CONTROL APPARATUS
Filed Aug. 21, 1957 3 Sheets-Sheet 2
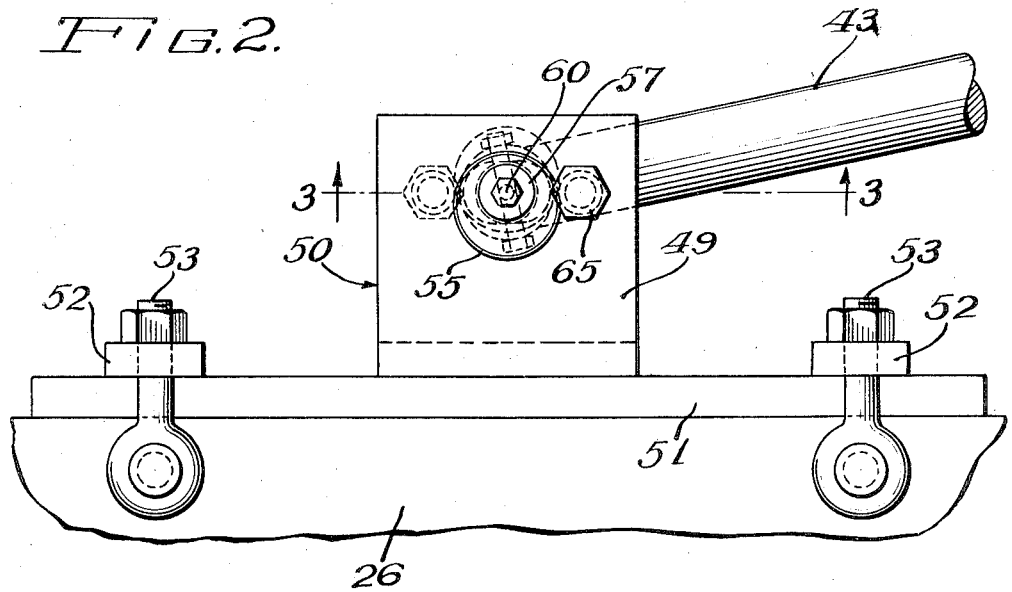
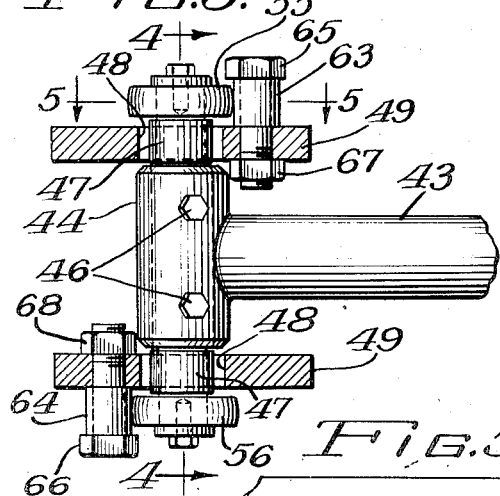
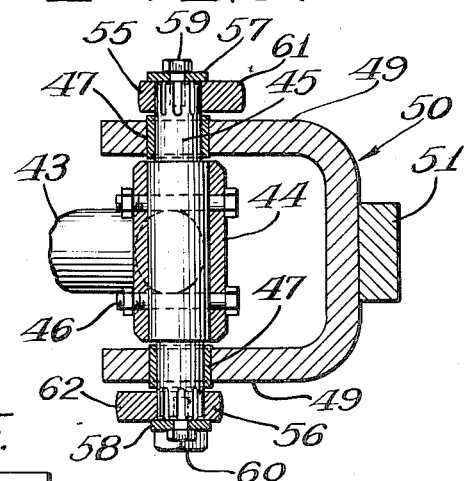
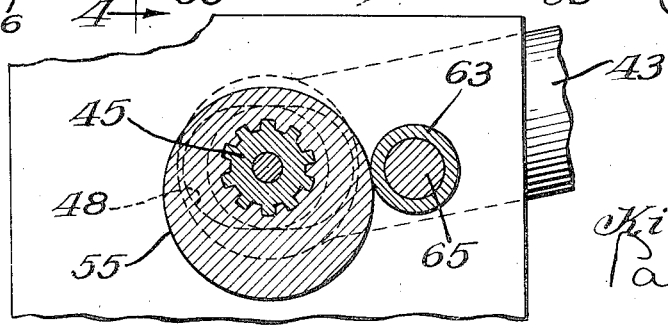
Inventor:
Kimo M. Welch
Paul O. Pippel
Atty.

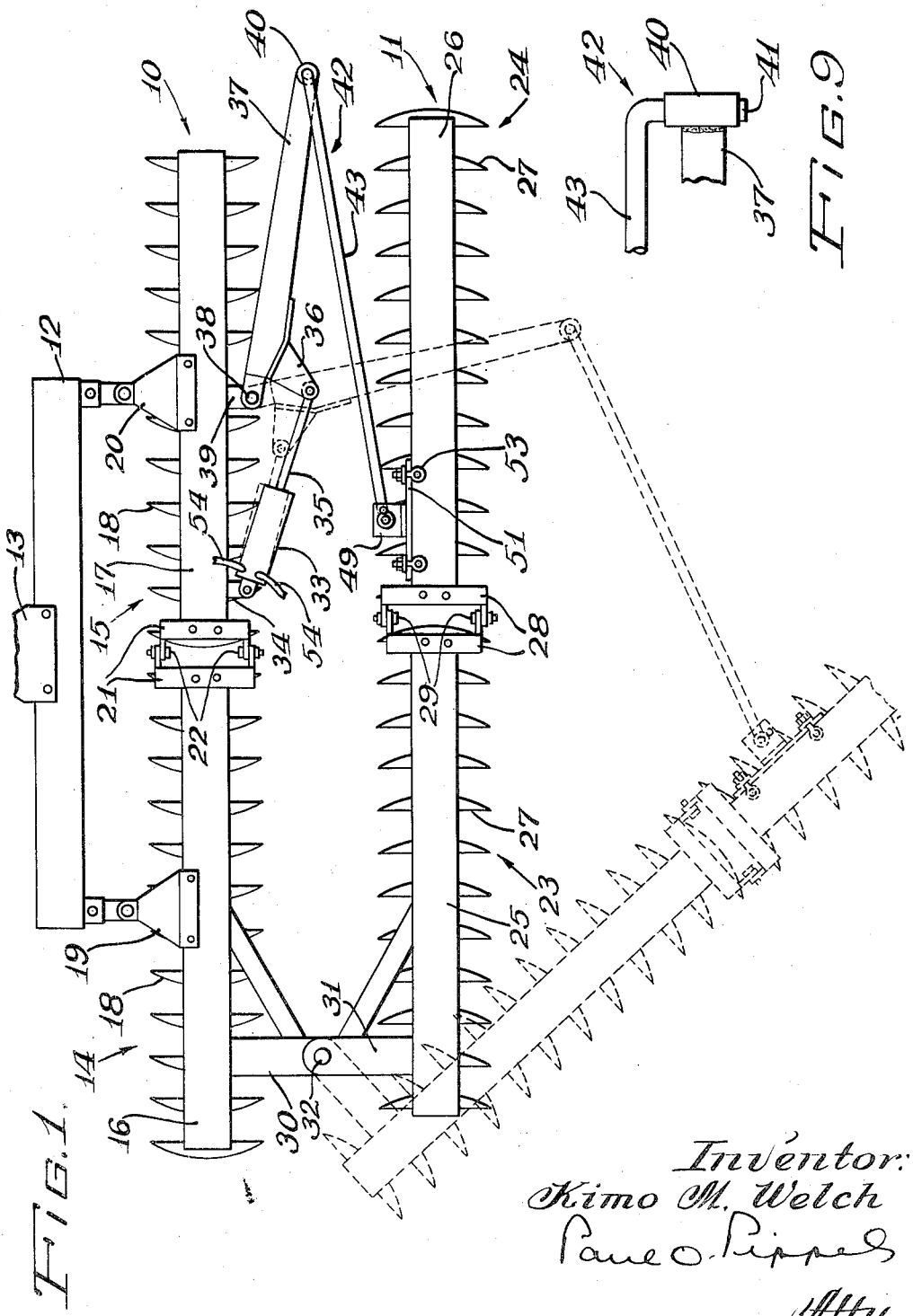

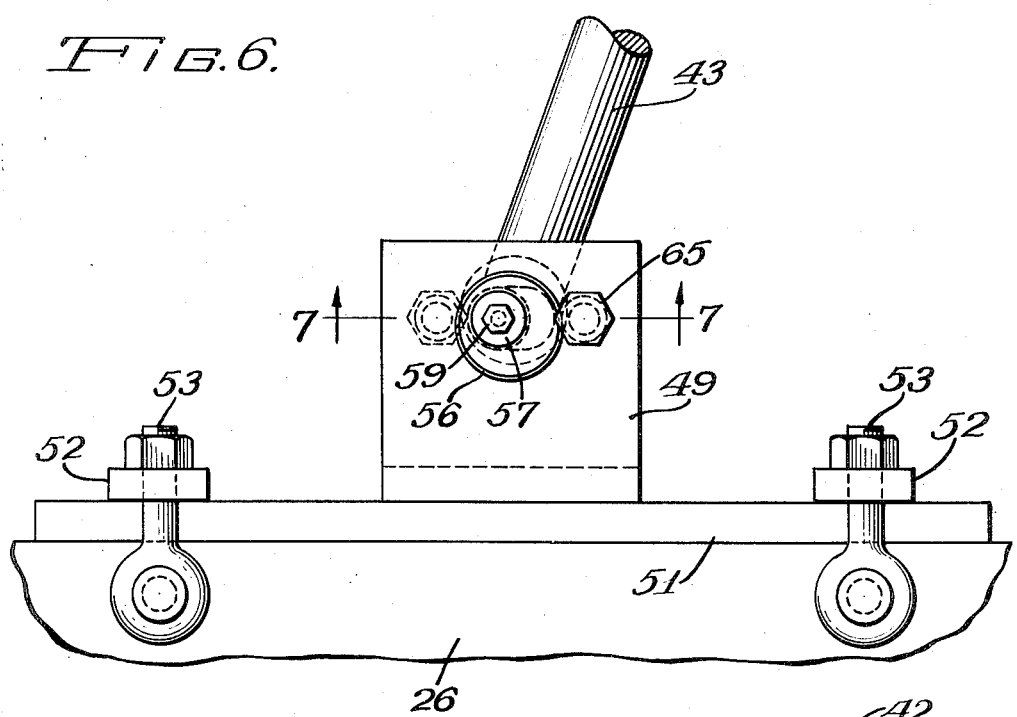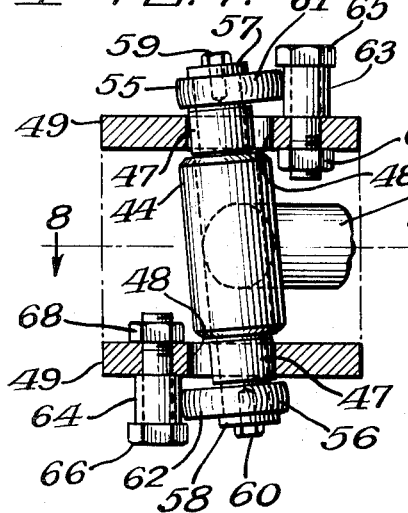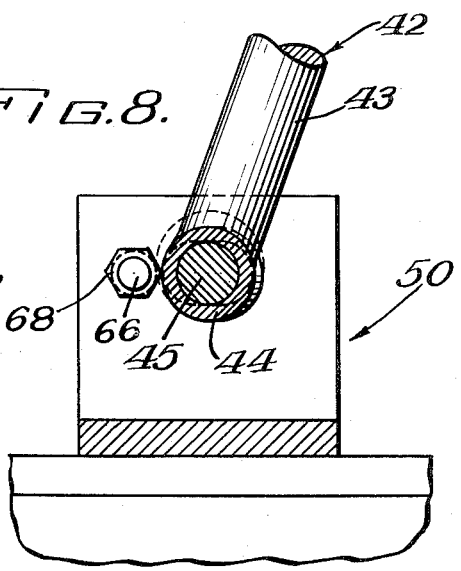

United States Patent Office 2,860,471
Patented Nov. 18, 1958

2,860,471

DISK HARROW TORSION CONTROL APPARATUS

Kimo M. Welch, Palo Alto, Calif., assignor to International Harvester Company, Chicago, Ill., a corporation of New Jersey Application August 21, 1957, Serial No. 679,397

9 Claims. (Cl. 55—81)

This invention relates to disk harrows and particularly to a disk harrow of the so-called offset type.

A trail-behind offset disk harrow consists of front and rear disk gang sections connected at one end on a vertical axis for horizontal swinging between parallel, or transport, and angled or operating positions. The disks of one gang have their concave sides facing in the opposite direction from those of the disks of the other gang; for example, in a right-hand offset harrow, that is, one having its hinge at the left-hand ends of the disk gangs with respect to the direction of travel, the disks of the front gang have their concave sides facing to the right, while the disks of the rear gang have their concave sides facing to the left. In a left-hand offset harrow these directions are reversed. For convenience, this invention is described in its relation to a right-hand disk harrow.

As pointed out above, in a right-hand offset harrow the concavity of the front gang faces to the right and that of the rear gang to the left, and the concave end of each gang tends to dig deeper than the opposite end thereof. Thus twisting forces are set up between the gangs of a harrow wherein the front gang of a right-hand offset disk harrow is subjected to forces which tend to rotate it to the right about a longitudinal axis, while the rear gang tends to rotate to the left about a longitudinal axis. These forces increase with the increase in working angle between the gangs.

In order to offset this tendency of the gangs to rotate in opposite direction about longitudinal axes it is necessary to overcome this tendency by the application of a balancing torque between the gangs, and this torque force must increase with the increase in working angle between the gangs, so as to insure that the implement will operate at a uniform depth of penetration of the disks.

The problem of the draft forces acting on the disks resulting in twisting strains on the harrow gangs becomes more pronounced in the wide type of harrow wherein front and rear gang sections are widened by the addition of another disk frame or gang. Due to the necessity of operating on land of varying contour, the two front gangs and the two rear gangs are hinged together on horizontal axes therebetween, and the angling connection is made between the outer front and rear gangs. The present invention has for its object the provision of an offset disk harrow wherein novel means are provided for balancing the twisting forces acting between the gangs.

Another object of the invention is the provision in an offset disk harrow having a hinged connection at one end, of control linkage between the outer portions of the gangs for regulating the angle therebetween, including novel means for overcoming the draft forces acting on the gangs to cause one end of each gang to dig deeper than the other, resulting in twisting forces being applied between the gangs.

Another object of the invention is the provision of control means for regulating the angle between the gangs of an offset disk harrow, wherein articulated linkage between the gangs is actuated to move the gangs from a parallel to a relatively angled position, including a torque bar having a pivoted connection to one of the gangs and having cam means incorporated in said connection adapted to twist said bar automatically to an extent corresponding to the increased angle between the gangs.

Other objects and advantages of the invention will become clear from the following detailed description when read in conjunction with the accompanying drawings wherein:

Figure 1 is a plan view of a flexible wide angle offset disk harrow embodying the features of this invention with the disk gang sections shown in their transport, parallel position, and indicating in the dotted line position of the rear section the angle between the sections when the implement is in operating position;

Figure 2 is an enlarged detail of a portion of the structure shown in Figure 1;

Figure 3 is a section taken on the line 3—3 of Figure 2;

Figure 4 is a section taken on the line 4—4 of Figure 3;

Figure 5 is a section, enlarged, on the line 5—5 of Figure 3;

Figure 6 is a view similar to Figure 2 illustrating another position of the parts;

Figure 7 is a view taken on the line 7—7 of Figure 6;

Figure 8 is a section taken on the line 8—8 of Figure 7; and

Figure 9 is an enlarged detail of a portion of the structure shown in Figure 1.

In the drawings, the numerals 10 and 11 refer, respectively, to the front and rear sections of a disk harrow having a transversely extending draft bar 12 and a longitudinally extending drawbar 13 adapted for connection to a tractive vehicle, not shown, by which the implement may be propelled over the ground. The front harrow section 10 consists of two transversely aligned frames or disk gangs 14 and 15, of generally conventional construction. However, it may be noted that the front gangs 14 and 15 include frame members 16 and 17, respectively, upon which are mounted a plurality of disks 18, which are dish-shaped, and the concave sides of which are directed to the right of the direction of travel of the implement in Figure 1.

The transverse draft bar 12 is pivotally connected at its ends to brackets 19 and 20 secured to the respective frame members 16 and 17. As is well understood in the art, the front disk frames or gangs 14 and 15 are flexibly connected to accommodate the front section of the implement to changes in ground contour, and the inner end of each of the frame members 16 and 17 has secured thereto a U-shaped member 21 extending longitudinally of the frame and hingedly connected by pivot pins 22.

The rear harrow section 11 comprises aligned left and right-hand disk gangs 23 and 24, which include aligned supporting frame members 25 and 26, respectively, each supporting a plurality of disks 27, the concave faces of which are directed to the left as viewed in Figure 1. The structure of rear section 11 is substantially the same as that of the forward section and includes longitudinally extending U-shaped members 28 affixed to the inner ends of the frame members 25 and 26 and hingedly connected by longitudinally aligned pivot pins 29.

In the solid line position of Figure 1 the disk harrow of this invention is shown with the front and rear sections 10 and 11 parallel for transport purposes. Near the left-hand end of front and rear gangs 14 and 23, a pair of frame members 30 and 31 are secured to and project horizontally from the respective gang frame members 16 and 25, and are pivotally connected by a vertical pivot pin 32 accommodating swinging of the rear section relative to the forward section to an operating position corresponding to that shown in dotted lines in Figure 1.

Control of the swinging of the gang sections 10 and 11 relative to each other to selected angular positions is preferably accomplished by means of a hydraulic cylinder 33 pivotally mounted upon a lug 34 secured to and projecting rearwardly from the frame member 17, and having slidable therein a piston rod 35 pivotally connected to a lug 36 affixed to a horizontal link 37 mounted upon a vertical pivot pin 38 carried by a clevis 39 secured to frame bar 17. The other end of link or bar 37 has affixed thereto a vertical bearing 40 having rotatably received therein the vertical spindle portion 41 of an elongated torsion bar 42 having a horizontal portion 43. Bar 37 is angled with respect to bar 42 in a toggle arrangement, and the other end of bar 42 has affixed thereto a vertical bearing 44 having mounted therein a vertical spindle 45 anchored to the bearing 44 by bolts 46.

Spindle 45 is parallel to the spindle portion 41 of the torsion bar 42, and has mounted thereon sleeves 47 receivable in slots 48 parallel to frame member 26, provided in the vertically spaced arms 49 of a U-shaped bracket 50 affixed to a bar 51 adjustably secured to the bar 26 by clamping elements 52 held in place by vertically spaced pairs of eye bolts 53, anchored to the beam 26, only one of which pairs is shown.

As pointed out before, in a right-hand disk harrow of the type shown and described, the right-hand end of the front section and the left-hand end of the rear section tend to dig deeper into the ground because of the aggressive action of the disks in the soil, thus setting up twisting forces tending to distort the harrow and imposing thereon operating characteristics which result in non-uniform operation of the disks. The present invention was designed to provide improved operation of the disk gangs by balancing the twisting forces referred to with oppositely directed forces. This is accomplished by mechanism including the torsion bar or link 42, the vertical spindle portions 41 and 45 of which are substantially parallel when the implement is in the closed position of Figure 1. Upon opening the harrow to operating position such as is indicated diagrammatically by the dotted line position of the rear section in Figure 1, bar 42 becomes a balancing spring acting in torsion to overcome the twisting forces resulting from the action of the earth on the implement and by means now to be described. Cylinder and piston units 33, 35 receive fluid under pressure through hose lines 54 from a source on the tractor, not shown, by which the implement is propelled, and upon the retraction of rod 35 in the cylinder the bars or links 37 and 42 are moved to the dotted line position shown in Figure 1. As shown clearly in Figure 4, cam members 55 and 56 are splined on the opposite ends of spindle 45 and are held against axial displacement therefrom by collars 57 and 58 and set screws 59 and 60.

The members 55 and 56 are eccentrically mounted with respect to the axis of spindle 45 and are provided with projecting cam surfaces 61 and 62, respectively. As the harrow sections 10 and 11 approach the dotted line position of Figure 1, the spindle 45 revolves with respect to bracket 50, members 55 and 56 revolving therewith. The projecting portions 61 and 62 of cam members 55 and 56 project from opposite sides of the axis of spindle 45 and engage cam rollers 63 and 64 surrounding the shanks of bolts 65 and 66, respectively, seated in openings provided in upper and lower arms 49 of bracket 50, the bolts being held in place by nuts 67 and 68. Spindle 45 then becomes canted, twisting torsion bar 42 about its axis, while the spindle portion 41 is held in a substantially vertical position. The effort of the spindle 45 to return to its vertical position exerts pressure downwardly upon the right-hand end of the rear harrow section and upwardly upon the right-hand end of the forward section, thus tending to maintain the harrow even and operating at a uniform depth. Canting or tilting of spindle 45 from a position such as shown in Figure 3 to that of Figure 7 is accommodated by the slots 48 which extend lengthwise of the associated harrow section and the amount of tilting varies with the angle between the front and rear harrow sections so that as the angle increases the pressure exerted by the torsion bar 42 to keep the forces acting on the harrow gangs in equilibrium is automatically increased.

The operation of the offset flexible disk harrow of this invention should be clearly understood from the foregoing description. It should likewise be understood that modifications may be made in the invention without departing from the spirit thereof or the scope of the appended claims.

What is claimed is:

1. In an offset disk harrow having front and rear transversely disposed disk-carrying sections pivotally connected at one end for horizontal swinging from a substantially parallel closed position to a relatively angled open position, connecting linkage between the other ends of the sections including a horizontal bar operatively connected to said sections for horizontal swinging therewith, the connection of said bar to one of said sections comprising vertically extending pivot means on the bar, a bracket affixed to said last-mentioned section adapted to pivotally receive said pivot means, and means cooperative between said bracket and said pivot means effective to automatically twist said bar about an axis generally perpendicular to said pivot means when said sections move from closed to open position.

2. In an offset disk harrow having front and rear transversely disposed disk-carrying sections pivotally connected at one end for horizontal swinging from a substantially parallel closed position to a relatively angled open position, connecting linkage between the other ends of the sections including a horizontal bar operatively connected to said sections for horizontal swinging therewith, the connection of said bar to one of said sections comprising vertically extending pivot means on the bar, a bracket affixed to said last-mentioned section adapted to pivotally receive said pivot means, and cam means in the connection between said bracket and said pivot means operative to shift said pivot means to a position at an angle to the vertical when said sections swing from closed to open position, whereby said bar is twisted.

3. In an offset disk harrow having front and rear transversely disposed disk-carrying sections pivotally connected at one end for horizontal swinging from a substantially parallel closed position to a relatively angled open position, connecting linkage between the other ends of the sections including a horizontal bar operatively connected to said sections for horizontal swinging therewith, the connection of said bar to one of said sections comprising vertically extending pivot means on the bar, a bracket affixed to said last-mentioned section adapted to pivotally receive said pivot means, a cam follower secured to said bracket and cam means on said pivot means operatively engageable with said follower during rotation of said pivot means upon swinging said bar to shift the pivot axis of said pivot means to an angle with respect to the vertical, whereby said bar is twisted.

4. The invention set forth in claim 2, wherein said pivot means at the end of said bar is rotatably received in slots provided in said bracket to accommodate the angling of said pivot means.

5. In an offset disk harrow having front and rear transversely disposed disk-carrying sections pivotally connected at one end for horizontal swinging from a substantially parallel closed position to a relatively angled open position, connecting linkage between the other ends of the sections including a horizontal bar operatively connected to said sections for horizontal swinging therewith, the connection of said bar to one of said sections comprising means resisting rotation of said bar about its axis, a shaft member affixed to the other end of said bar transverse to the axis thereof, means pivotally connecting said shaft to said other section to accommodate horizontal swinging of said bar relative thereto, and means in the pivotal connection of said shaft to said other section operative to twist said bar about its axis in response to swinging of said sections from a closed to an open position.

6. In an offset disk harrow having front and rear transversely disposed disk-carrying sections pivotally connected at one end for horizontal swinging from a substantially parallel closed position to a relatively angled open position, connecting linkage between the other ends of the sections including a horizontal bar operatively connected to said sections for horizontal swinging therewith, the connection of said bar to one of said sections comprising means resisting rotation of said bar about its axis, a shaft member affixed to the other end of said bar transverse to the axis thereof, means pivotally connecting said shaft to said other section to accommodate horizontal swinging of said bar relative thereto, said shaft being generally vertical and rotatable in horizontal slots provided in said other section accommodating bodily swinging of said shaft about the axis of said bar, and means reacting between said shaft and said section operable upon rotation of said shaft in one direction to swing the latter about the axis of said bar.

7. The invention set forth in claim 6, wherein a cam is affixed to said shaft and an abutment member on said section is engageable by the cam to move said shaft in said slot.

8. The invention set forth in claim 7, wherein both ends of said shaft have cams secured thereto and engageable with abutments on said section, said cams being so disposed as to move the associated ends of the shaft in opposite directions during rotation thereof to impart a twist to one end of said bar.

9. An offset disk harrow having front and rear transversely disposed disk-carrying sections pivotally connected at their inner ends for horizontal swinging from a substantially parallel closed position to a relatively angled open position, each said section comprising a pair of axially aligned disk gang frames pivotally connected for relative swinging in a vertical plane, and means forming a pivotal connection between the outer ends of said sections including a horizontal bar operatively connected to the outer gang of said front section by means resisting torque forces tending to twist said bar about its axis, and means pivotally connecting the other end of said bar to the outer gang of said rear section including means operative upon swinging said sections from closed to open position to exert a downward pressure upon the outer end of the outer gang of said rear section, said last-mentioned means comprising a shaft affixed to said other end of the bar, a bracket affixed to the outer gang of said rear section, said bracket being apertured to rotatably receive opposite ends of said shaft, cams carried by said shaft and cam followers mounted on said bracket engageable by said cams to cant said shaft upon rotation of the latter.

References Cited in the file of this patent

UNITED STATES PATENTS

| | | |
|---|---|---|
| 2,404,252 | Rutter | July 16, 1946 |
| 2,568,082 | McKay | Sept. 18, 1951 |
| 2,604,746 | Frank et al. | July 29, 1952 |
| 2,685,159 | Brundage | Aug. 3, 1954 |
| 2,798,419 | Moriceau | July 9, 1957 |